INVENTOR.
ROSS C. LIBBY

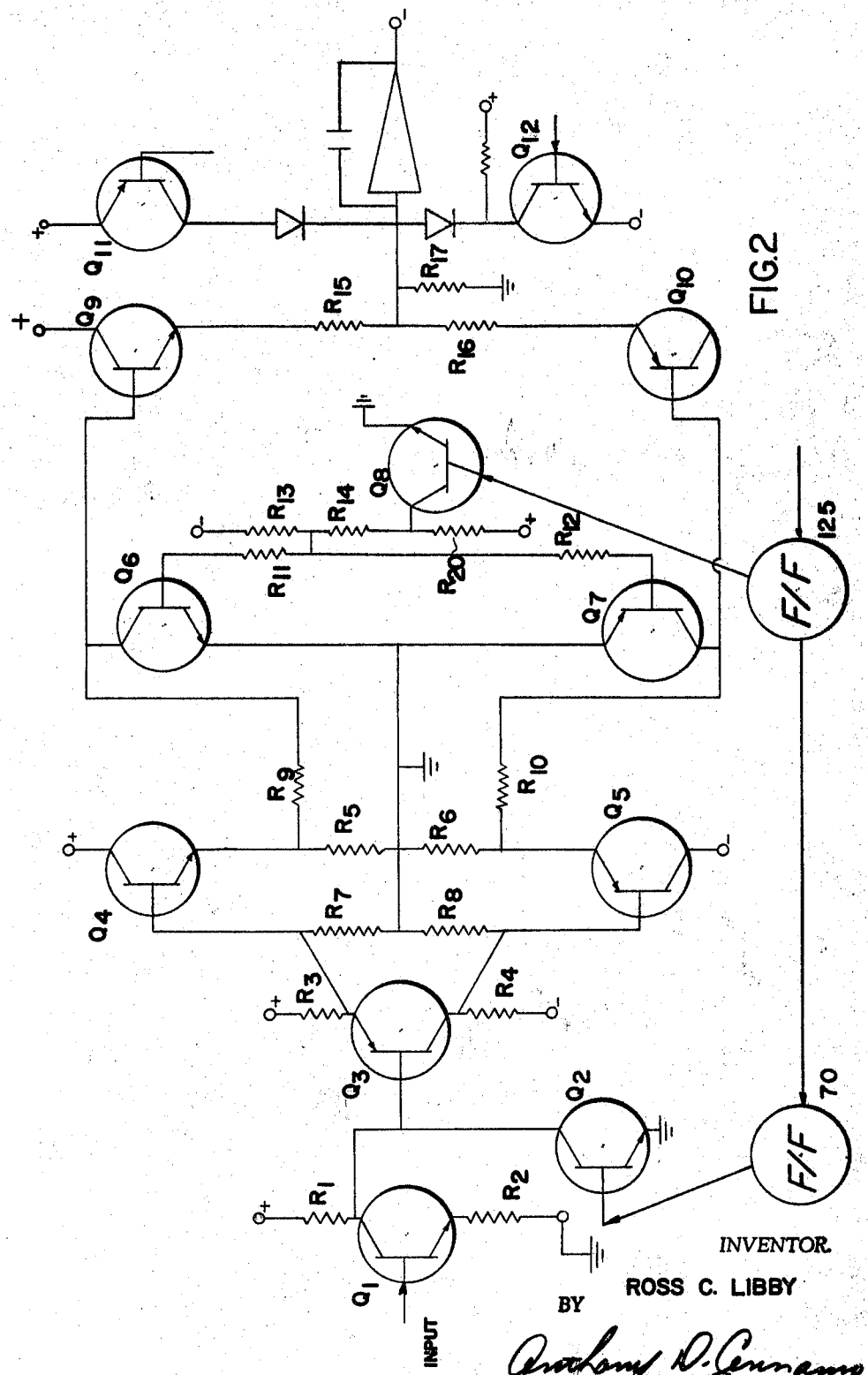

INVENTORS
ROSS C. LIBBY

United States Patent Office 3,434,074
Patented Mar. 18, 1969

3,434,074
HIGH SPEED, WIDE FREQUENCY RANGE
FEEDBACK CIRCUIT
Ross C. Libby, West Jefferson, Ohio, assignor to The Ohio
State University Board of Trustees, Columbus, Ohio
Filed Jan. 16, 1967, Ser. No. 609,624
U.S. Cl. 331—183                                        2 Claims
Int. Cl. H03b 5/00

ABSTRACT OF THE DISCLOSURE

The invention is for a high speed, wide frequency range feedback circuit which, by rapid electronic processing, utilizes a D.C. signal as feedback information to control the frequency of operation of a high voltage electrical generator. This generator functions as the source for a high power ultrasonic transducer whose peak power output is at its resonant frequency.

Cross references and background

There is disclosed in the co-pending application filed by Robert C. McMaster and Berndt B. Dettloff, S. N. 508,812, for "Transducer," a sonic transducer that combines the driving element (piezoelectric) with the mechanical displacement amplifier (horn) in a novel way. The transducer therein disclosed is a high Q transducer, exceptionally rugged, compact, and capable of carrying continuous work loads. There is disclosed in another co-pending application—also filed on November 18, 1965, S. N. 508,774, for "Sonic Transducer" in the name of Charles C. Libby, and assigned to the same assignee as transducer utilizing the principles of the transducer in the aforementioned application. The overall structure is an improved transducer and has as certain of its novel features the means for attachment of the transducer to a tool. Still, and most significantly, in another co-pending application filed for "Electromechanical Transducer," by Hildegard Minchenko, S.N. 571,490, and assigned to the same assignee, there is disclosed a transducer capable of delivering extremely high power, i.e., measurable in horsepower (or kilowatts) at an acoustical frequency range. The structural design of the transducer permits extraordinary power output from the driving elements. By clamping the piezoelectric elements both radially and longitudinally (axially) the acoustic stresses in the piezoelectric elements are always compressive, never tensile, even under maximum voltage excitation.

The maximum watts power output of an electromechanical transducer—such as the resonant structures disclosed in the aforementioned co-pending applications—will be produced when it is driven at its resonant frequency. Unfortunately, when the transducer drives a load the exact resonant frequency of the transducer may not be easily determinable—nor once established will it always remain at that exact frequency. Specifically, it has been found that the resonant frequency of the transducer varies under load changes above or below its no-load valve. It is believed that the resonant frequency will vary with the temperature of the transducer or with changes in the inertia or compliance of the load, as well as with changes in the degree of or excellence of coupling to a given load. Also as the power is delivered, due to the load changes caused by changes in voltages supplied to the transducer, the resonant frequency will change. Since the resonant curve of a given high Q transducer is extremely sharp, a very small change in its resonant frequency will result in an extremely high loss of its power capability with a fixed-frequency supply.

Brief summary of the invention

The present invention provides an electrical generator for driving a high power electromechanical transducer at its resonant frequency. The inherent disadvantages of the prior art are overcome with the circuit of the present invention by utilizing the feedback principle. More specifically, the frequency of the output signal of the high power voltage generator is not fixed—it is continuously varying both above and below the over-all resonant curve of the transducer. The output power to the transducer is continuously measured to provide a feedback signal to the generator which will automatically vary the frequency in a direction which will provide maximum output power. In this way the exact resonant frequency of the structure is continuously matched by continuously varying the frequency of the intput signal.

Accordingly, it is a principle object of the present invention to provide a new and improved high voltage generator for driving an electromechanical transducer.

It is another object of the invention to provide a high voltage generator that is continuously variable in frequency and which frequency will vary in accordance with the frequency of maximum power input to the transducer.

A further object of the invention is to provide a feedback circuit for varying the frequency of the voltage generator —that is derived from the maximum power signal.

Other objects and features of the present invention will become apparent from the following detailed description when taken in conjunction with the drawings in which:

Detailed description

Figure 1:
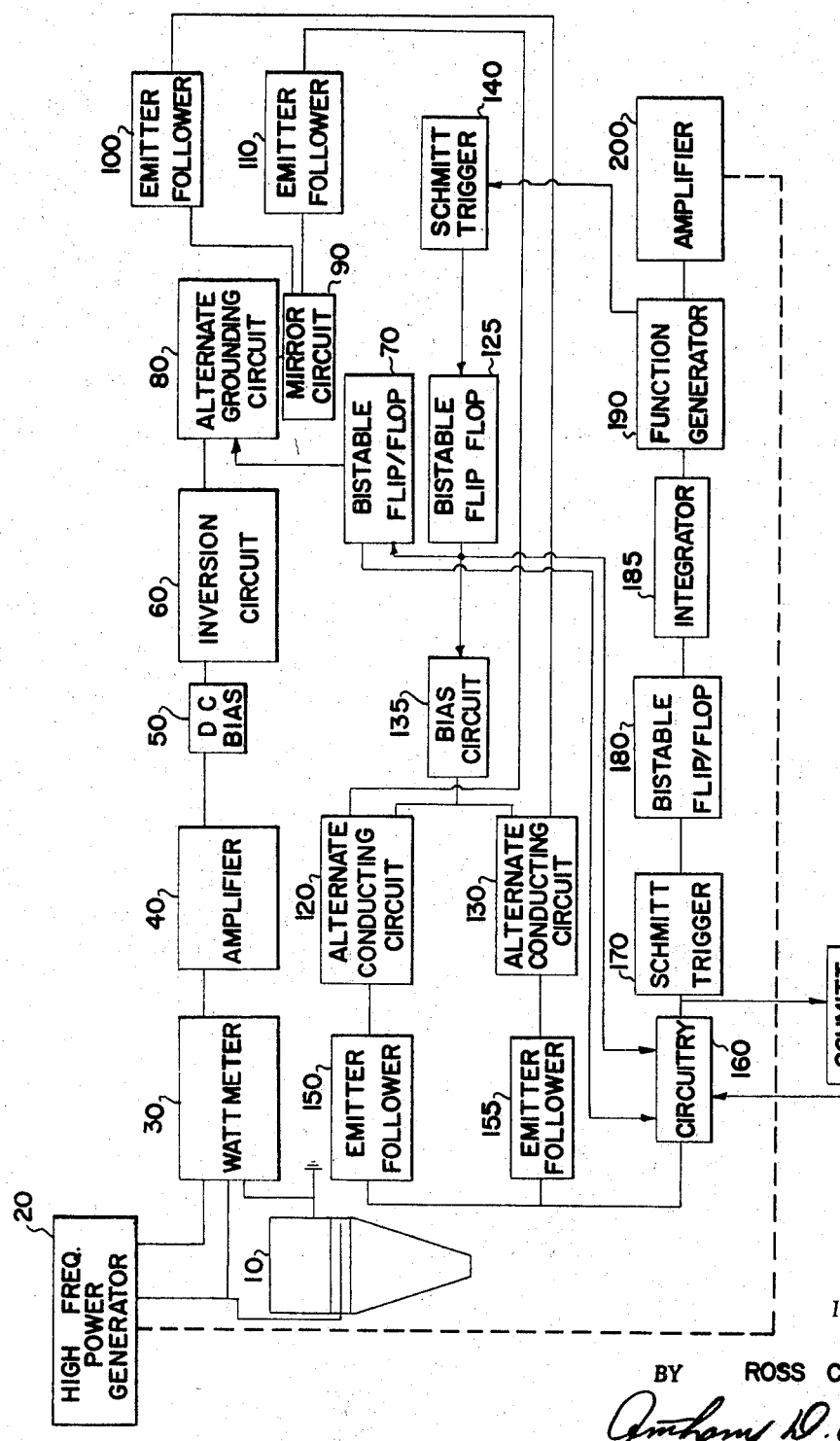
FIGURE 1 is a schematic diagram in block incorporating the features of the preferred embodiment of the invention.

Referring now generally to the several figures the operation of the preferred embodiment is to instantaneously measure the power output from the voltage generator or the input to the transducer. Successive cycles of the measured signal are compared in power leve lby integrating and then taking their sum. The output of the sum circuit is utilized to determine whether the frequency of the generator should be increased or decreased for maximum power.

More specifically the ouput signal of the voltage generator is of a frequency that is continuously changing in successively different directions. The result of the sum circuit determines whether the changing frequency is proceeding in a proper direction to maximize the power output. The purpose being that the frequency should be changing in a direction that will approach maximum power output from the transducer. That is, the frequency of the voltage generator should be swinging in a direction approaching the transducer resonant frequency. For instance, if the sum of the power of two consecutive cycles is positive there is a decrease in power (watts) output. Again, if the next sum of the two consecutive cycles is negative there is an increase in power (watts). Accordingly, if there is shown an increase in watts—negative output from sum circuit—the change in frequency is in the wrong direction. In this instance, appropriate action is taken automatically to correct the successive changes in frequency.

Whether the frequency of the generator is increasing or decreasing is of no importance. It is necessary, however, in the proper operation of the preferred embodiment, to have a signal whose frequency is continuously changing and of most importance to determine whether the direction of frequency change is in the desired direction.

As pointed out above, with a very high Q transducer such as those shown in the aforementioned co-pending applications, a very small change in frequency will result in a large change in watts for any given supply voltage and load characteristic.

The sweep rate—the rate of change of frequency—in the preferred embodiment is in the order of .01% per cycle of the generator. In this way the feedback circuit causes a change (automatically or manually adjustable rate) of the order of 1000 cycles per second for a given 10,000 cycle frequency. Accordingly, for each one second interval there is a sweep of 1000 Hertz per second.

The signal is sampled, as described hereinafter, at a rate which is equivalent to one (1) cycle for every four (4) cycles of supply voltage. At this rate the samples are taken twice with the maximum resonant range of frequency of the transducer. This range, for example may be 10 cycles in a 10,000 cycle high Q transducer. Under these conditions it has been shown that the sweep rate is high enough that the change in watts due to change in load characteristic cannot change the resonant frequency faster than the adjustment caused by the feedback. Simply, the feedback circuit constantly examines the frequency/watts relationship and adjusts the generated frequency to that which delivers maximum power to the transducer.

Referring now specifically to FIGURE 1 the signal output of the high frequency voltage generator 20 that drives the transducer 10 is sampled and measured by wattmeter 30. The wattmeter 30 in this instance is of the "Hall effect" type and produces a sine wave (AC) with a frequency twice that of the supply voltage. The average value (or in other words the D.C. value) of the wattmeter 30 output equals the product of the voltage times current times the current voltage phase angle of the signal the wattmeter 30 is measuring. The AC wave represents the instantaneous product of the voltage and current which the wattmeter is measuring. However, because the output voltage of the wattmeter is extremely small the signal is amplified to a reasonable level with a high quality, low drift amplifier 40.

A fixed D.C. bias from source 50 was added to the wattmeter output. In this way the wattmeter output is superimposed on D.C. In order to assure that its output was positive at all times the D.C. value of the bias is never less than zero, however it is always below that of the sine wave peak. That is, although the wattmeter 30 output signal is a sine wave its average value is raised by a fixed amount (D.C. bias).

The positive wave form signal output from circuit 50 is inverted in inversion circuit 60. When the signal output of circuit 50 is a large D.C. output the inversion circuit 60 will be a very small output. Alternatively when the D.C. output of circuit 50 is small, the inversion in circuit 60 of a small signal will result in a large D.C. signal. Thus when the output power of the voltage generator 20 is decreasing (the integration of each successive cycle is decreasing- the resulting integration of each successive cycle after inversion will be increasing in size. The converse will also be true. Further, since as pointed out hereinafter, the first cycle is positive and the second cycle is negative there will be a change in the sign of the net integration of the two cycles, only when the watts are decreasing. In this way it is readily detected when the watts are decreasing. Obviously when the watts remain the same, the net integration will be zero, i.e., an integration of a positive valve with an identical negative wave in the next cycle.

The specific inversion circuit 60 utilized in a preferred embodiment is shown in FIG. 2 comprising transistor Q1, resistors R1, R2 and positive and negative voltage sources. The ratio of resistors of $R1/R2$ is the voltage gain of Q1. In this particular instance it is a gain of 10. Resistor R2 also determines the input impedance of the inversion circuit.

The output of the inversion circuit 60 is fed to the alternate grounding circuit 80—shown in block in FIG. 1. The purpose of this circuit is to cause the positive and negative output signals from inversion circuit 60 to be alternately grounded to zero volts. In FIG. 2, the alternate ground circuit 80 is also shown in detail. Transistor circuit Q2 is adapted to receive alternate signals from a bistable flip/flop circuit 70. Circuit 70 is flipped at half the rate of circuit 135, by circuit 125. Circuit 70 is conventional and hence is not shown in detail in FIG. 2. By action of the flip/flop circuit the Q2 transistor circuit is alternately forward and reversed biased. The transistor circuit Q2 in actual operation is therefor "turned on" by two out of four voltage cycles fed thereto from the bistable flip/flop 125. Circuit 125 is flipped at half the rate of schmitt trigger 140. Circuit 140 is turned on and off at the same rate as the function generator circuit 190. Thus Q2 conducts in accordance with the function generator output, i.e., first and second cycles on, third and fourth cycles off.

The on-off output signals of the alternate ground circuit 80 is fed to mirror circuit 90. Again with particular reference to FIG. 2 the output of the transistor circuit Q2 is fed to the transistor circuit Q3. Together with resistors R3 and R4 the transistor circuit Q3 forms the mirror image circuit 80. Since transistor Q2 circuit is alternately reverse and forward biased the base of transistor circuit Q3 is alternately grounded. There will result, therefore, at the output of transistor Q3 circuit two identical but mirror "images" of its input from the inversion circuit 60. In other words, with a given five volt input from the inversion circuit 60 the output of circuit 80 would be the simultaneous production of positive and negative five volts on different outputs. The output is present as aforementioned for 2 out of 4 cycles. It is understood that resistors R3, R4 must be the same value to assure that the two outputs are identical in size (but opposite in sign).

The plus and minus output signals from the mirror circuit 90 are fed to emitter follower circuits 100 and 110 respectively. The purpose of these circuits 100 and 110 is simply to separately amplify the current for the positive and negative signal outputs from the paraphase amplifier 90.

Referring again to FIG. 2 specifically, the emitter follower circuits 100 and 110 are shown schematically. In operation resistors R7, R8 stabilize the input impedance to the dual emitter follower circuits Q4 and Q5. As a rule of thumb the resistors R7, R8 should be ten times greater resistance than resistors R5, R6, and ten times larger than resistors R3 and R4 to prevent undue loading of Q3.

The resistors R9, R10 prevent the remaining circuitry from adversely loading the emitter follower amplifiers Q4 and Q5. Improper loading would result in "mirror images" becoming unequal in size if the positive and negative signals were affected.

As shown in FIG. 1 the outputs of emitter followers 100 and 110 are fed respectively to alternate conducting circuits 130 and 120. the puropse of these circuits 130 and 120 is to alternately short out the positive and negative signals from the emitter follower circuits 100 and 110— but never both at once. In operation the sequence of shorting out the outputs is as follows: (1) positive present, negative shorted out, (2) then negative present and positive shorted (3) and (4) then both shorted for two cycles by the alternate grounding circuit 80 . . . then the cycle is repeated. Which signals are shorted out is dependent upon the bias from the bias circuit 135 and circuit 80.

Referring again to FIG. 2 the alternate grounding circuits comprise transistors Q6 and Q7 with their bases commonly tied together. The transistors Q6 and Q7 are of PNP, NPN types, hence when both bases are positive only the NPN will conduct and when both bases are negative only the PNP will conduct. Thus only one transistor circuit will conduct at any one instant and in this way only one of the positive-negative inputs will be shorted out. The resistors R11, R12 prevent the bases of transistors Q6 and Q7 from drawing excessive current from the bias network (circuit 135 of FIG. 1) formed by resistors R13, R14, R20 and transistor Q8. With the assumption that the resistors R11 and R12 have negligible current flow and with transistor Q8 off, the bias will be determined by R13, R14 and R20. Also by making R13 a very large resistance (in comparison with R14, R15) the bias will be plus. Alternately by turning on a transistor Q8, i.e. by the triggering from the flip/flop circuit 125 (of FIG. 1), the plus bias is effectively shorted out at Q8's collector making the bias negative on the common bases of transistors Q6 and Q7. The resistance ratio $R14/R13$ determines how negative the bias will be. Resistor R20 limits the current when transistor Q8 is turned on. When transistor Q8 is turned off the resistance ratio of $R20+R14$ to the resistance of R13 determines how positive the bias will be.

The bias circuit 135 is adapted to change the bias from a plus to a minus merely by turning transistor Q8 on and off. It is controlled, i.e., turned off and on, by the bistable flip/flop circuit 125. This two state flip/flop circuit is triggered once on every voltage cycle by the schmitt trigger circuit 140.

As shown in FIG. 1 the outputs of the alternately conducting circuits 120 and 130 are fed respectively to emitter-follower amplifiers 150 and 155. These amplifier circuits receive the plus and minus signals respectively every other cycle—both never receive a signal at the same time, due to the aforementioned alternate conducting circuits.

Referring again to FIG. 2 the transistor circuits Q9 and Q10 alternately form an emitter-follower type of amplifier through resistors R15 and R17 or R16 and R17 respectively. The purpose of resistors R15 and R16 is to prevent a short circuit should the unlikely event occur that Q10 and Q9 were both to receive signals at the same time. The output of emitter-followers 150 and 155 is developed across R17 having one end connected to ground. Due to loading of the previous circuitry R17, in practice, should be equal to R9 and R10 in emitter follower circuits 100 and 110.

The output developed across the common outputs of emitter followers 150 and 155 is fed to the operational amplifier in circuit 160. In function the operational amplifier has capacitive feedback, thus causing it to continuously integrate its input. The input from the emitter followers 150 and 155 consists of alternate and almost identical waves, but opposite in sign. The net result will thus approach zero, as the second wave (of opposite sign) is integrated with the first wave. At this point the input signal is grounded by the alternate grounding circuit 80 (transistor Q2 of FIG. 2) and the output of the operational amplifier in circuit 160 is checked by the trigger circuit 170. The capacitor C1 (which has the net integration stored in it) is discharged to zero volts, by transistor circuits Q11 and Q12 (FIG. 2).

Figure 2A:
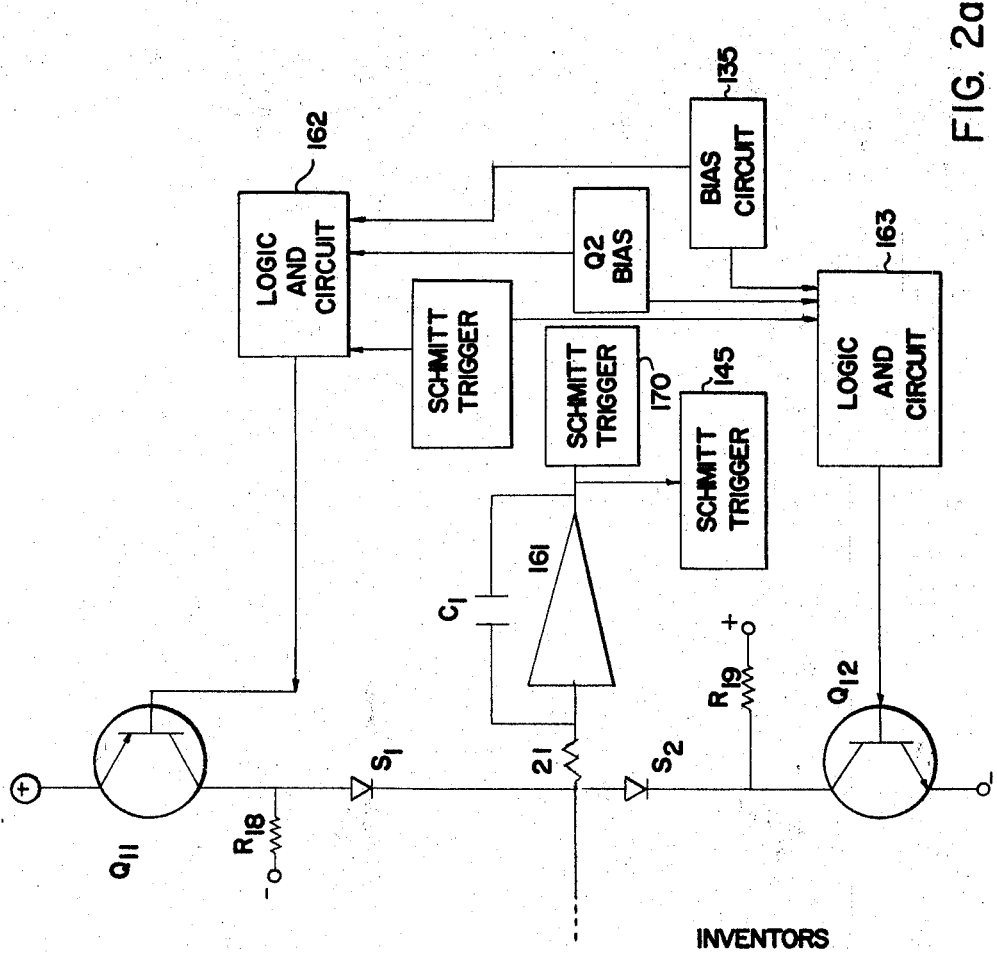
FIGURE 2 is a schematic diagram illustrating in detail certain of the circuits shown in block in FIGURE 1; and, FIGURE 2a is a continuation of FIGURE 2.

The integration, reset, logic and operational amplifier circuit 160 is shown in FIG. 2a partly in schematic i.e., transistors Q11 and Q12 and partly in block i.e., operational amplifier 161 and logic circuits 162 and 163. Also repeated in this figure, for purposes of simplicity of explanation are schmitt trigger 145, bias circuit 135, and the bias circuit Q2 (alternate grounding circuit 80). In operation of the circuit 160 the capacitor C1—which has the net integration stored in it—is discharged to zero volts, by transistor circuits Q11 and Q12. Specifically, transistor Q11 is turned on for a maximum time equivalent of one cycle (of supply voltage) to help reset the output of circuit 160 for a new integration. When Q11 conducts, its positive output cancels any negative signal left in the operational amplifier in circuit 160. The conditions for Q11 to be conducting are:

(1) Positive output of flip/flop 70 causing transistor Q2 to conduct.
(2) Positive output of flip/flop 125 causing transistor Q8 to conduct.
(3) Positive output of Schmitt trigger 145 caused by a negative output from the operational amplifier in circuit 160.

When Q12 conducts, its negative output cancels any positive signal on circuit 160, but not enough to trigger Schmitt trigger 170. The conditions for Q12 to be conducting are:

(1) Positive output of flip/flop 70 causing transistor Q2 to conduct.
(2) Negative output of flip/flop 125 causing transistor Q8 to stop conducting.
(3) Negative output of Schmitt trigger 145 caused by a positive output from the operational amplifier in circuit 160.

Thus the input to the operational amplifier in circuit 160 (as related to numbered cycles of signal voltage) is:

(1) Positive wattmeter signal.
(2) Negative wattmeter signal.
   (a) Schmitt trigger 170 triggers if integration is a net negative at this point.
(3) Q11 conducts, if third condition is met.
(4) Q12 conducts, as long as third condition is met.
(5) Recycle.

The logic "and" circuits 1 and 2 will turn on transistors Q11 and Q12 respectively, only when their three individual conditions are met. Conditions 1 and 2 of both logic circuits allow Q11 and Q12 to conduct for one cycle out of four, and Q11 and Q12 can never conduct simultaneously. Condition 3 for logic circuits 1 and 2 further restrict the conduction of Q11 and Q12 to less than one cycle of the signal voltage.

Q11 conducts after the two cycles have been integrated by circuit 160. Q11 thus causes schmitt trigger 145 and 170 to be reset to indicate a positive charge on circuit 160. When circuit 160 has a positive output (as detected by circuit 145), Q11 turns off, thus disconnecting the positive voltage from the integrator.

Q12 then conducts when the remaining conditions 1 and 2 are met (since condition 3 has been met by the action of Q11). Q12 conducts until Schmitt trigger 145 indicates a negative charge. However, this negative charge is not quite negative enough to trigger schmitt trigger 170 into giving a false indication of power decrease.

This positive, negative sequence is the only way that any type of residual charge on circuit 160 may be removed with certainty. In particular, the positive signal from Q11 must come first to prevent false triggering of circuit 170.

The diodes S1 and S2 prevent the input to R21 in circuit 160 from being affected by the collector potentials of Q11 and Q12. R18 and R19 limit current flow to the collector bias when Q11 or Q12 conduct. R21 and C1 determine the output of the integrator 160 for a given input.

If the operational amplifier in circuit 160 output has gone negative at any time, this would mean that the watts (power from generator 20) are decreasing. Or in other words, if the second negative cycle is larger in amplitude, it would discharge the positive integration from the first positive wave and result in a net negative charge. The second wave would be larger, even though the watts decreased, since as mentioned earlier the watt meter output was inverted—thus smaller inputs, cause larger outputs. Also as mentioned before, since the output only changed sign when the watts decrease, detection has been facilitated by the use of a Schmitt trigger circuit 170 continuously monitor the output of the operational amplifier in circuit 160 to detect a negative sign.

The bistable flip/flop 180 connected to the Schmitt trigger 170 converts the monitored signal output to a square wave pulse. The square wave pulse reverses itself, or flips, every time a new integration takes place provided a negative charge is produced in the operational amplifier in the integrator, reset and logic circuit 160. The Schmitt trigger 170 produces a positive pulse as long as a negative charge is present in the operational amplifier of circuit 160. (The negative disappears at the beginning of each resetting at four-cycle intervals.) Thus the bistable flip/flop 180 will not flip until the watts decrease.

It could be stated that every time the flip/flop 180 changes state there has been loss of power. It is assumed that when the power output (watts) of the input signal decreases this is due to the incorrect direction of frequency change of the signal being applied to the transducer. It being pointed out above, the frequency is either constantly increasing or decreasing, never fixed. Thus when something causes the power to decrease, it is understood that the direction in which the frequency is changing is wrong and must be reversed. This is accomplished by the bistable flip/flop 180. As stated above, whatever state the flip/flop circuit 180 is in, it flips when the watts decrease is detected by the Schmitt trigger.

The integrator 185 is an operational amplifier in the integration mode because of the capacitance feedback. In operation then the integrator 185 changes the flip/flop 180 square wave into a triangular wave. The slope of the triangular wave is dependent on the input voltage resistor R22 and the size of the feedback capacitor.

The triangular wave from the integrator is fed to the function generator 190. This is a commercial device that will change its frequency linearly according to a voltage input. Thus with a triangle wave input, the frequency would be either increasing or decreasing.

The output of the function generator 190 is amplified by circuit 200 and fed back to the high power generator 20 so that the frequency of the drive signal is varied in close proximity to the resonant point of the transducer 10. This completes the feedback loop.

It is expressly understood, of course, that the above arrangement of circuits and modifications may be had within the scope of the invention. It is further understood that multiple circuits in cascade will monitor each cycle for loss of power and hence provide even closer control of the frequency of the high power generator.

The circuit has the advantage of broad range feedback, that is, it will follow a frequency change in the order of at least ±10% without outside adjustment. The level is dependent upon the frequency stability of the function generator, and its limits of frequency alternations due to D.C. voltage input.

Also, the response of the circuit to changes in watts is attributed to the function of averaging one cycle and comparing it to the next—averaging out the A.C. component. It is appreciated that the same output could be obtained with a filter to remove the A.C. component and a differentiating network to show watts decrease, but this would be at least several factors slower due to the action of the filter.

Thus the circuit, as shown up to and including Schmitt trigger 170, can be thought of as a high-speed differentiating circuit to determine change in D.C. levels superimposed on any A.C. signal, *provided* the exact frequency of the A.C. can be provided as input.

Some changes or modifications including this circuit of the present invention would encompass:

(1) Maximize *or* minimize watts by changing frequency.

(2) Maximize or minimize current flow by changing frequency.

(3) Maximize or minimize voltage at some component by changing frequency.

What is claimed is:

1. An electromechanical conversion system including a high voltage electrical generator, a high power ultrasonic transducer, and a feedback control circuit to maintain the frequency of operation of said generator at the resonant frequency of said ultrasonic transducer, the improvement comprising an oscillator producing an alternating signal of a predetermined frequency; means utilizing high speed, wide frequency range electronic circuitry for converting each cycle of said signal to a D.C. level, means for averaging said D.C. level, means for comparing said D.C. level of one cycle with the average D.C. level of a succeeding cycle, means for detecting the difference in D.C. levels between said cycles thereby averaging out the A.C. component of said signals, and means utilizing said difference to control the frequency of said oscillator, said feedback control circuit comprises, in combination, a wattmeter which produces an A.C. signal; means for amplifying said signal; means for superimposing said amplified signal on a fixed positive D.C. bias; means for inverting said signal, means for alternately grounding the positive and negative output signals from said inverting means; means for producing from the output of said alternately ground means two signals of equal magnitude but opposite polarity; means for separately amplifying said last named signals; means for alternately shorting out the said positive and negative signals from said last named amplifying means; means for integrating the signals from said alternating shorting means; means for utilizing said integrated signal to control the frequency of operation of said generator at the resonant frequency of said transducer.

2. An electromechanical conversion system as set forth in claim 1 wherein said means for comparing said average D.C. level of one cycle with the average D.C. level of a succeeding cycle further comprises means for said comparison at a sampling rate of one cycle in every four cycles of the output voltage of said oscillator.

References Cited

UNITED STATES PATENTS

| | | | |
|---|---|---|---|
| 2,498,760 | 2/1950 | Kreithen | 318—118 |
| 2,917,691 | 12/1959 | Prisco et al. | 318—118 |
| 2,995,689 | 8/1961 | Scarpa | 318—118 |

JOHN KOMINSKI, *Primary Examiner.*

U.S. Cl. X.R.

310—8.1, 26; 318—116, 118